United States Patent
Fujiki (10) Patent No.: US 9,930,191 B2
(45) Date of Patent: Mar. 27, 2018

(54) IMAGE FORMING APPARATUS AND NON-TRANSITORY COMPUTER READABLE MEDIUM

(71) Applicant: FUJI XEROX CO., LTD., Tokyo (JP)

(72) Inventor: Ryuji Fujiki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/347,197

(22) Filed: Nov. 9, 2016

(65) Prior Publication Data

US 2017/0374207 A1  Dec. 28, 2017

(30) Foreign Application Priority Data

Jun. 23, 2016  (JP) ................... 2016-124395

(51) Int. Cl.
*G06K 15/00* (2006.01)
*H04N 1/00* (2006.01)

(52) U.S. Cl.
CPC ..... *H04N 1/00082* (2013.01); *H04N 1/00005* (2013.01); *H04N 1/00015* (2013.01); *H04N 1/00029* (2013.01); *H04N 2201/0082* (2013.01)

(58) Field of Classification Search
CPC ........... H04N 1/00082; H04N 1/00005; H04N 1/00015; H04N 1/00029; H04N 2201/0082
USPC ....................................................... 358/1.14
See application file for complete search history.

(56) References Cited

U.S. PATENT DOCUMENTS

| | | | | |
|---|---|---|---|---|
| 8,902,465 B2* | 12/2014 | Yokoyama | ........... | H04N 1/6033 345/589 |
| 2015/0170008 A1* | 6/2015 | Hashizume | ........ | H04N 1/00005 358/1.15 |
| 2017/0054876 A1* | 2/2017 | Matsuzaki | ........... | H04N 1/6008 |
| 2017/0064095 A1* | 3/2017 | Matsuzaki | ......... | H04N 1/00037 |

FOREIGN PATENT DOCUMENTS

| | | |
|---|---|---|
| JP | 2008-224745 A | 9/2008 |
| JP | 2013-201610 A | 10/2013 |

\* cited by examiner

*Primary Examiner* — Neil R McLean
(74) *Attorney, Agent, or Firm* — Sughrue Mion, PLLC (57) ABSTRACT

An image forming apparatus includes an output unit, a reading unit, and a processor. The output unit outputs multiple types of charts. The reading unit reads images of the charts. The charts are output by the output unit. The processor performs multiple types of processes in a predetermined order in accordance with the images of the charts and original images used to output the charts. Each of the processes is at least one of diagnosis and adjustment. The images of the charts are obtained through the reading operation performed by the reading unit. The charts which are output by the output unit include a diagnostic chart for a spot and/or a streak and a diagnostic chart for transfer. After the processor performs a first diagnosis based on the diagnostic chart for a spot and/or a streak, the processor performs a second diagnosis based on the diagnostic chart for transfer.

4 Claims, 8 Drawing Sheets

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-124395 filed Jun. 23, 2016.

BACKGROUND

Technical Field

The present invention relates to an image forming apparatus and a non-transitory computer readable medium.

SUMMARY

According to an aspect of the invention, there is provided an image forming apparatus including an output unit, a reading unit, and a processor. The output unit outputs multiple types of charts. The reading unit reads images of the multiple types of charts. The charts are output by the output unit. The processor performs multiple types of processes in a predetermined order in accordance with the images of the charts and original images used to output the charts. Each of the multiple processes is at least one of diagnosis and adjustment. The images of the charts are obtained through the reading operation performed by the reading unit. The charts which are output by the output unit include a diagnostic chart for a spot and/or a streak and a diagnostic chart for transfer. After the processor performs a first diagnosis based on the diagnostic chart for a spot and/or a streak, the processor performs a second diagnosis based on the diagnostic chart for transfer.

BRIEF DESCRIPTION OF THE DRAWINGS

Exemplary embodiment of the present invention will be described in detail based on the following figures, wherein.

DETAILED DESCRIPTION

An exemplary embodiment of the present invention will be described in detail with reference to the drawings.

Figure 1:
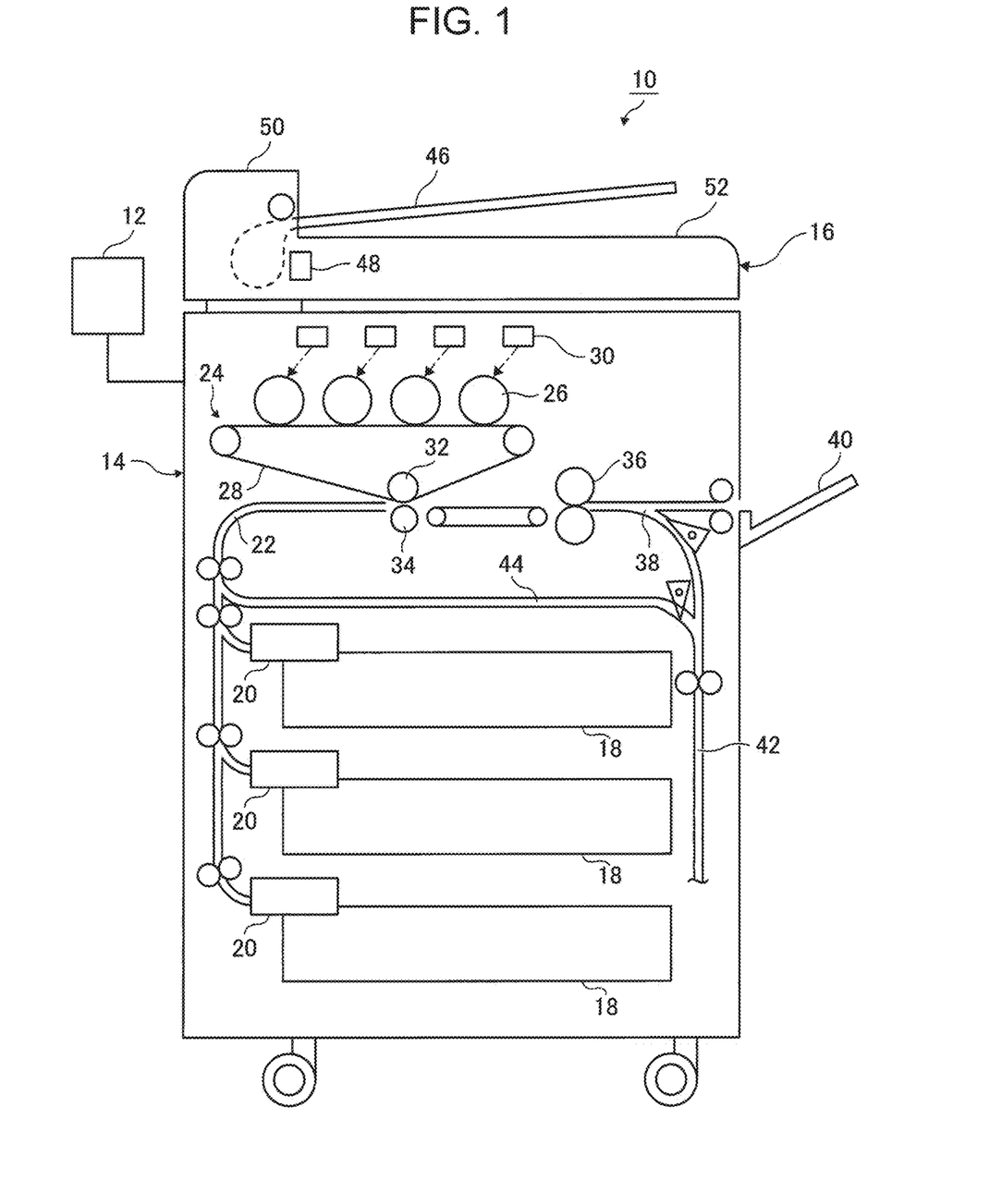
FIG. 1 is a diagram illustrating the configuration of an image forming apparatus according to the exemplary embodiment of the present invention.

FIG. 1 illustrates an image forming apparatus 10 according to the exemplary embodiment of the present invention.

The image forming apparatus 10 includes a user interface 12, an image output unit 14, and an image reading unit 16.

The user interface 12 includes a display device that displays information and an input receiving device that receives an input performed by an operator. The user interface 12 is constituted, for example, by a touch panel and the like. The operator may input operational setting information through the user interface 12.

The image output unit 14 includes, for example, three recording-medium supplying units 18. Each of the recording-medium supplying units 18 is provided with a supply head 20.

When one of the recording-medium supplying units 18 is selected, the supply head 20 is activated to supply a recording medium from the selected recording-medium supplying unit 18 via a recording-medium supplying path 22 to an image output core unit 24.

In the image output core unit 24, photoreceptors 26 for yellow, magenta, cyan, and black are arranged side by side, and an intermediate transfer belt 28 is provided.

Around each photoreceptor 26, not only an exposure device 30 but also a charging device, a developing device, a first transfer device, a cleaning device, and the like (not illustrated) are disposed, and a toner image formed by using each photoreceptor 26 is transferred onto the intermediate transfer belt 28. The exposure device 30 is constituted, for example, by light-emitting diodes (LEDs) configured in such a manner that the amount of light emitted to each dot is capable of being adjusted.

A recording medium is conveyed to a position at which a backup roller 32 faces a second transfer roller 34, and the toner images on the intermediate transfer belt 28 are transferred to the recording medium. That is, a voltage whose polarity is opposite to that of toner is applied between the backup roller 32 and the second transfer roller 34, and the toner images on the intermediate transfer belt 28 are transferred to the recording medium. The recording medium on which the toner images have been transferred is conveyed to a fixing device 36 which fixes the toner images onto the recording medium. The recording medium on which the toner images have been fixed is discharged through a recording-medium discharge path 38 to a discharge unit 40.

When a setting for duplex printing has been made, the recording medium whose front side has been subjected to fixing by the fixing device 36 is conveyed from the recording-medium discharge path 38 to a reversing device 42 which reverses the recording medium. The recording medium is then conveyed to a recording-medium reversing path 44, and is conveyed back to the recording-medium supplying path 22. Then, the recording medium is conveyed to the image output core unit 24, and printing is performed on the back side of the recording medium.

The image reading unit 16 includes a document supplying unit 46 to which a document is supplied, an image reading sensor 48 which is formed of a charge coupled device (CCD) or the like, a document feeding device 50 which feeds the document from the document supplying unit 46 to the image reading sensor 48, and a document discharging unit 52 which discharges the document from which an image has been read by using the document image reading sensor 48.

Figure 2:
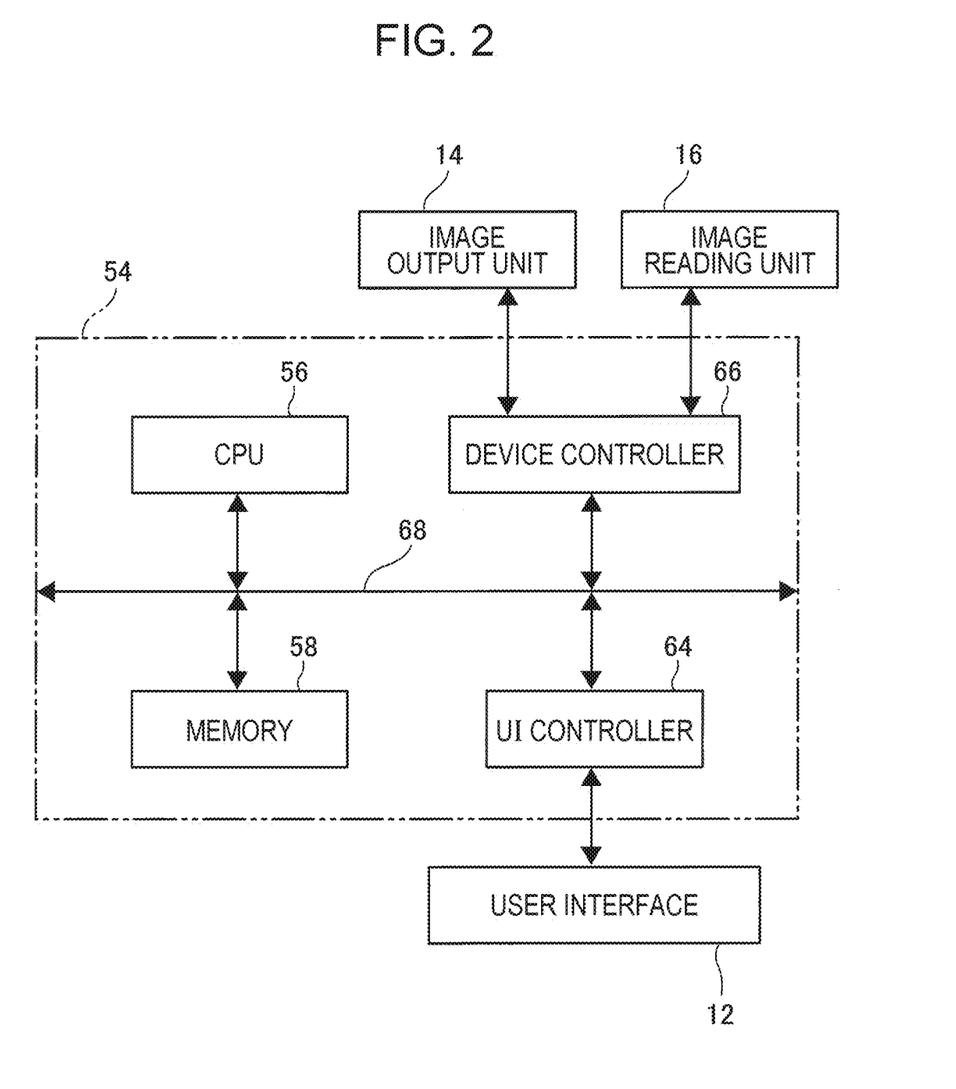
FIG. 2 is a block diagram illustrating a controller according to the exemplary embodiment of the present invention.

FIG. 2 illustrates the hardware configuration of a controller 54 of the image forming apparatus 10.

In the controller 54, a central processing unit (CPU) 56, a memory 58, a user interface (UI) controller 64, and a device controller 66 are connected to one another via a control bus 68.

The CPU 56 performs predetermined processes according to a control program stored in the memory 58. The UI controller 64 controls the above-described user interface 12. The device controller 66 controls the image output unit 14 and the image reading unit 16.

A process flow performed by the CPU 56 will be described.

Figure 3:
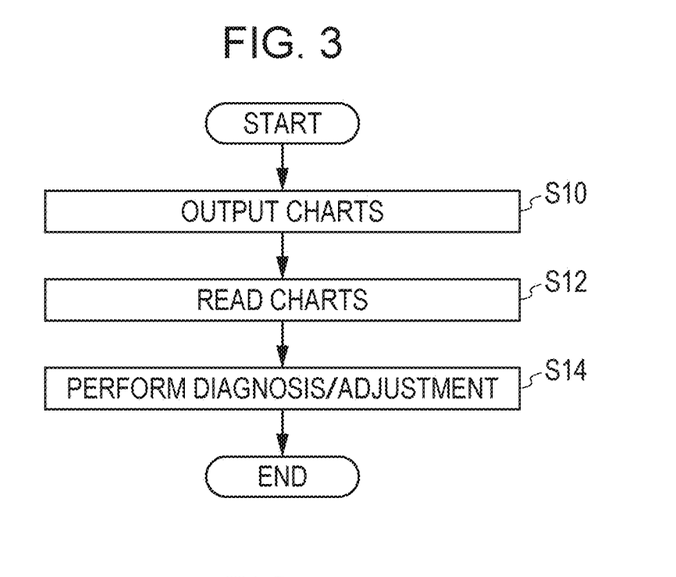
FIG. 3 is a flowchart illustrating a process flow according to the exemplary embodiment of the present invention.

FIG. 3 is a flowchart for a program executed by the CPU 56.

In step S10, multiple types of charts which are stored in advance in the memory 58 are output from the image output unit 14.

In the next step S12, the multiple types of charts which have been output in step S10 are read in a single operation by using the image reading unit 16, and the read images are stored in the memory 58.

In the next step S14, an original image of each chart which is stored in advance in the memory 58 is compared with the read image of the chart which is obtained through the reading operation in step S12, and diagnosis/adjustment for the image forming apparatus 10 is performed.

FIGS. 4 to 8B illustrate specific examples of the above-described multiple types of charts.

Figure 4:
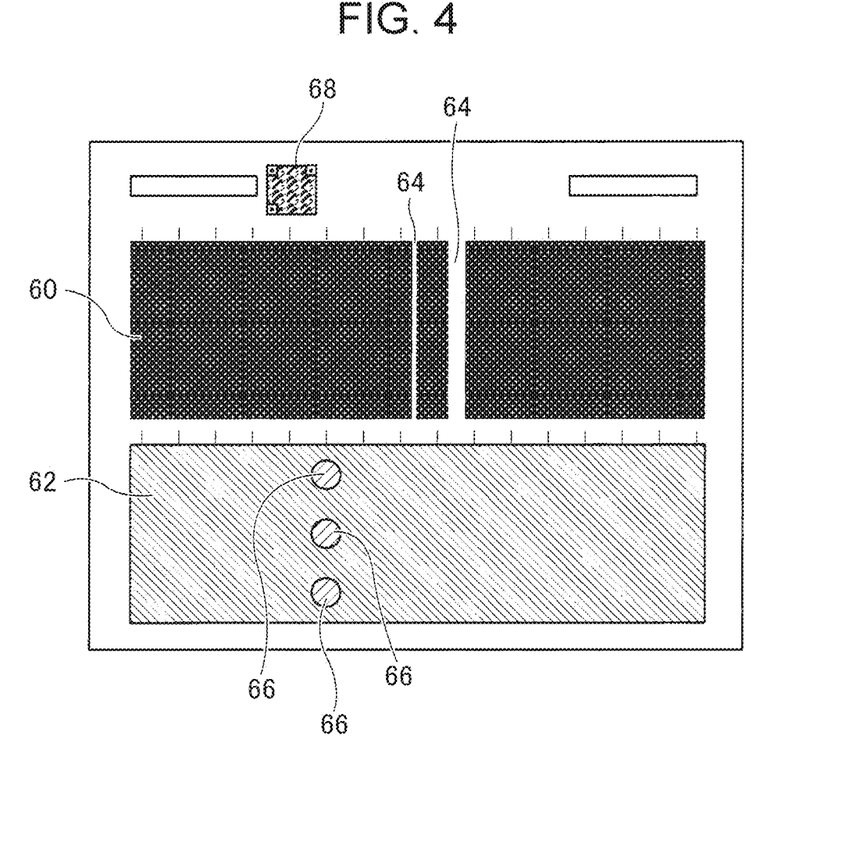
FIG. 4 is a plan view of a diagnostic chart for a spot and/or a streak which is used in the exemplary embodiment of the present invention.

FIG. 4 illustrates a diagnostic chart for a spot and/or a streak which is output. The diagnostic chart for a spot and/or a streak contains, for example, a halftone pattern portion 60 of achromatic color and a halftone pattern portion 62 of cyan. In FIG. 4, streaks 64 are present in the halftone pattern portion 60 of achromatic color, and spots 66 are present in the halftone pattern portion 62 of cyan. These streaks 64 and spots 66 are image quality defects which have occurred due to flaws or the like of devices, such as the supply heads 20, the second transfer roller 34, and the roller of the fixing device 36 described above.

To specify that this is a diagnostic chart for a spot and/or a streak, code information 68 such as a two-dimensional barcode is printed.

Figure 5:
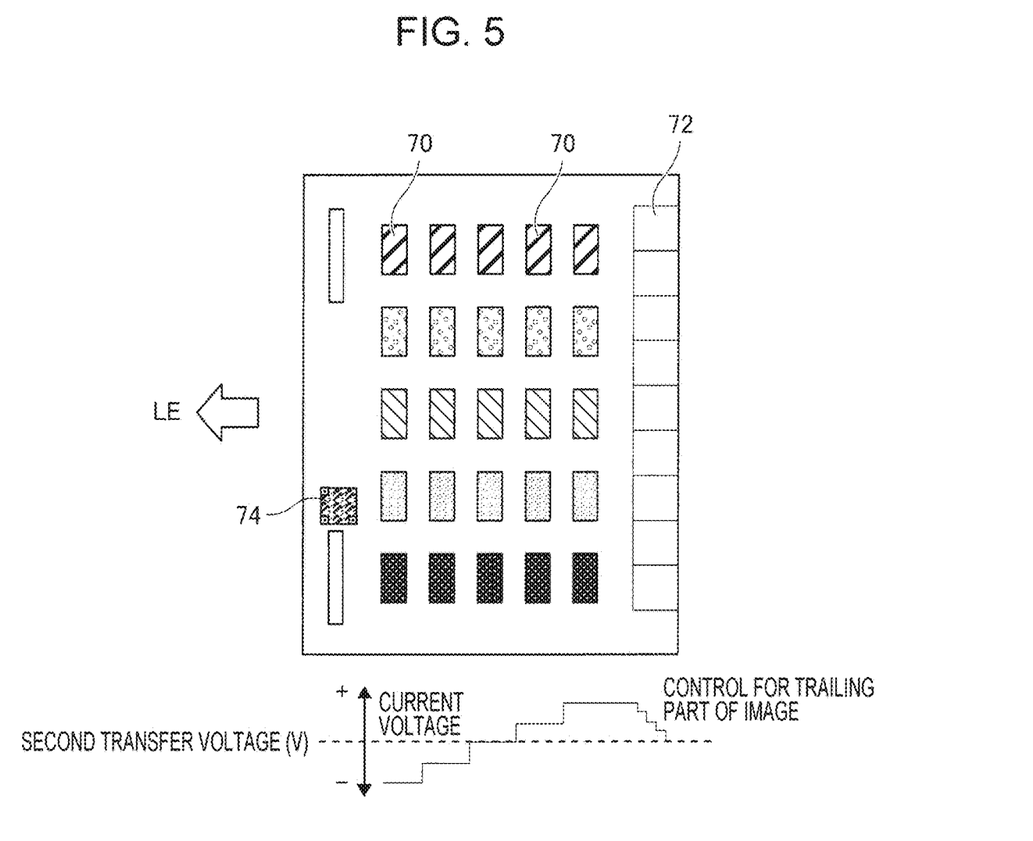
FIG. 5 is a plan view of a diagnostic chart for transfer which is used in the exemplary embodiment of the present invention.

FIG. 5 illustrates a diagnostic chart for transfer which is output. In the diagnostic chart for transfer, patches 70 of each color are formed with the transfer voltage being changed by specific amounts in steps after the recording medium reaches the second transfer roller 34 described above. For example, the transfer voltage is set to a level lower than the current transfer voltage level by two levels. While the transfer voltage is increased in steps to a level that is higher than the current transfer voltage level by two levels, patches 70 are formed. Then, diagnosis is performed in which it is determined which transfer voltage level is a level at which an image having the target density has been formed. In addition, it is determined for each patch 70 whether or not an image defect has occurred. In a trailing portion of the recording medium, a step image 72 is formed with the transfer voltage being gradually decreased in steps. The step image 72 is used to determine whether or not step control is to be performed in the trailing portion of a recording medium.

To specify that this is a diagnostic chart for transfer, code information 74 such as a two-dimensional barcode is printed.

Figure 6A:
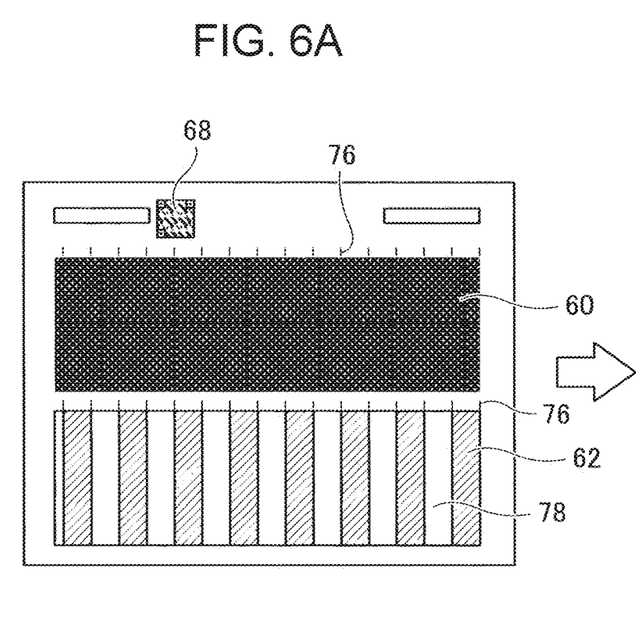
FIGS. 6A and 6B are plan views of exposure adjustment charts before and after adjustment which are used in the exemplary embodiment of the present invention.
Figure 6B:
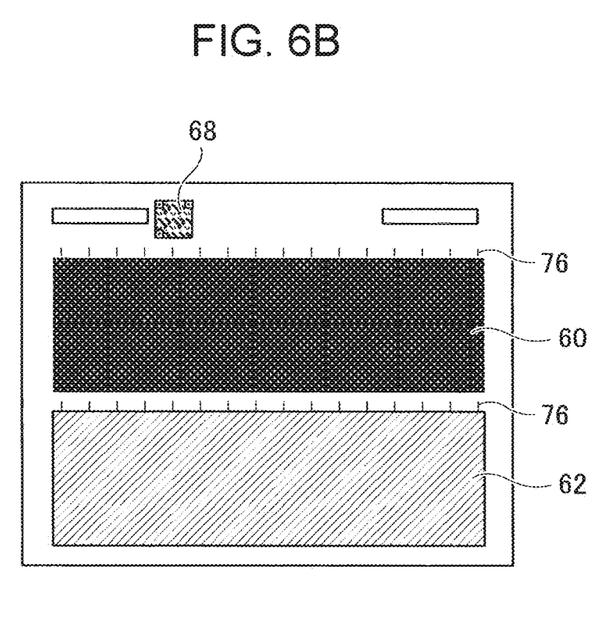

FIG. 6A illustrates an exposure adjustment chart before adjustment which is output. FIG. 6B illustrates the exposure adjustment chart after adjustment. The exposure adjustment chart is the same as the diagnostic chart for a spot and/or a streak described above, and contains, for example, the halftone pattern portion 60 of achromatic color and the halftone pattern portion 62 of cyan. In addition, a position pattern 76 corresponding to the chip positions of the LEDs of the exposure device 30 described above is printed. As illustrated in FIG. 6A, when the amounts of exposure made by using LEDs vary in a cyclical manner, vertical density-non-uniformity portions 78 are present on a chip-by-chip basis. When such a vertical density-non-uniformity portion 78 is present, the amount of light emitted from the LED of the exposure device 30 is adjusted as illustrated in FIG. 6B so that the vertical density-non-uniformity is suppressed.

Figure 7A:
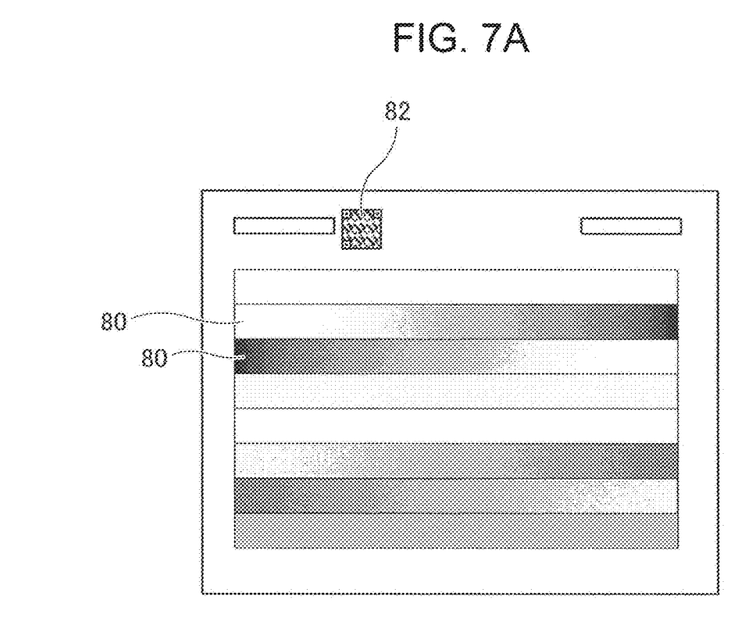
FIGS. 7A and 7B are plan views of density non-uniformity adjustment charts before and after adjustment which are used in the exemplary embodiment of the present invention.
Figure 7B:
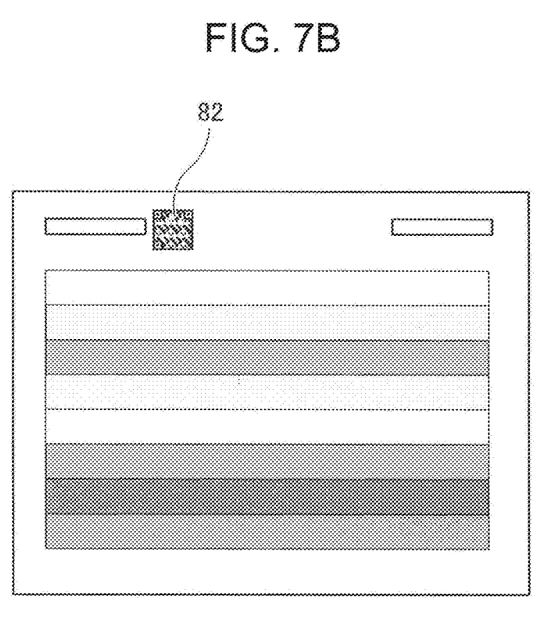

FIG. 7A illustrates a density non-uniformity adjustment chart before adjustment which is output. FIG. 7B illustrates the density non-uniformity adjustment chart after adjustment. In the density non-uniformity adjustment chart, solid images of colors are formed in the main scanning direction. As illustrated in FIG. 7A, when density non-uniformity portions 80 are present, density adjustment is performed so that the density non-uniformity is negated as illustrated in FIG. 7B.

To specify that this is a density non-uniformity adjustment chart, code information 82 such as a two-dimensional barcode is printed.

Figure 8A:
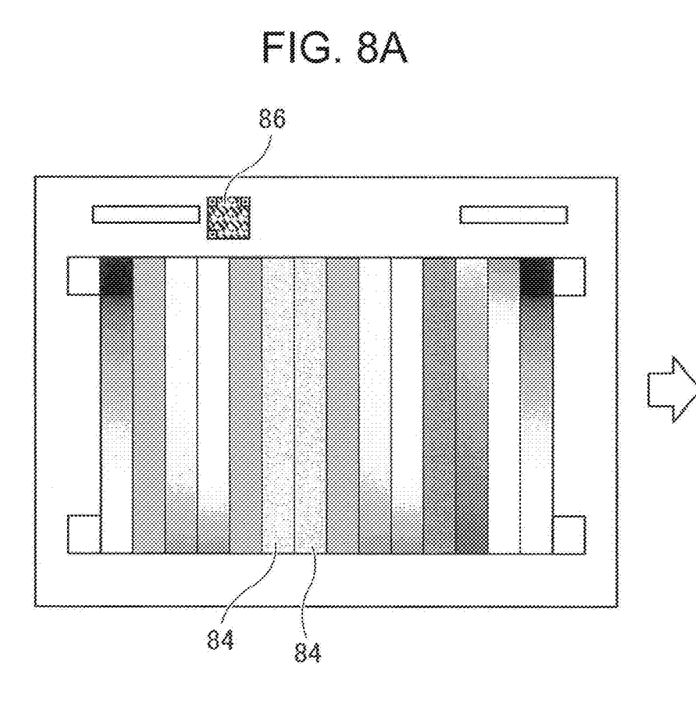
FIGS. 8A and 8B are plan views of gradation adjustment charts before and after adjustment which are used in the exemplary embodiment of the present invention.
Figure 8B:
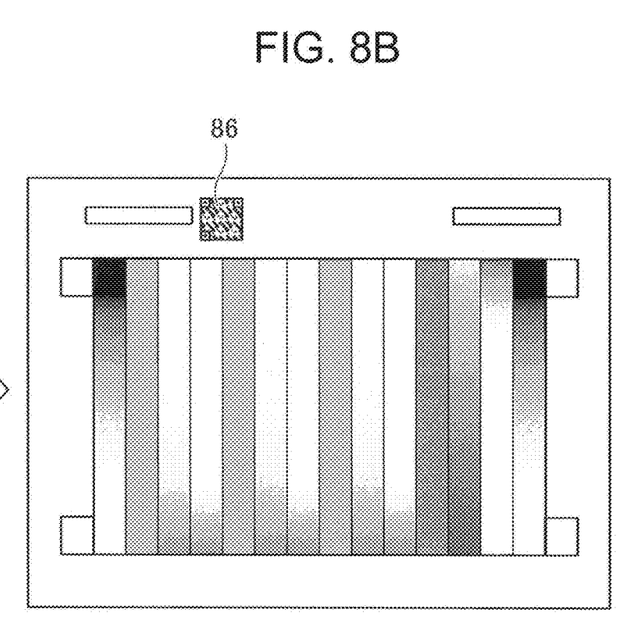

FIG. 8A illustrates a gradation adjustment chart before adjustment which is output. FIG. 8B illustrates the gradation adjustment chart after adjustment. In the gradation adjustment chart, the density of each color is gradually changed from 0% to 100% in the sub-scanning direction. As illustrated in FIG. 8A, when faulty gradation portions 84 in which gradation has not been produced as intended are present, gradation adjustment is performed as illustrated in FIG. 8B so that the gradation is produced as intended.

To specify that this is a gradation adjustment chart, code information 86 such as a two-dimensional barcode is printed.

Figure 9:
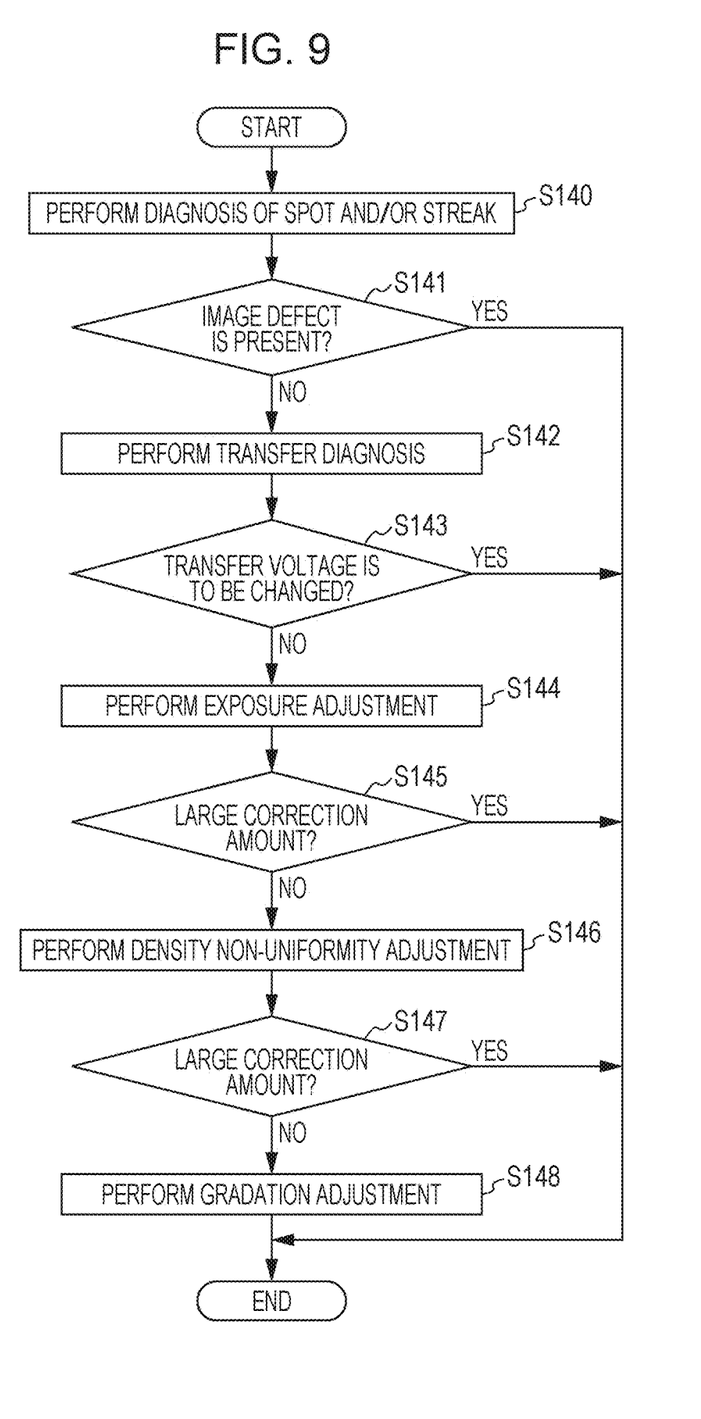
FIG. 9 is a flowchart describing the details of a diagnosis/adjustment step according to the exemplary embodiment of the present invention.

FIG. 9 is a flowchart describing the details of the diagnosis/adjustment step S14 described above.

In step S140, the diagnostic chart for a spot and/or a streak is selected from the multiple types of charts which are obtained through the reading operation in step S12. The diagnostic chart for a spot and/or a streak is selected on the basis of the code information 68. In the next step S141, the image of the selected diagnostic chart for a spot and/or a streak is compared with the original image, and it is determined whether or not an image defect is present. If it is determined that an image defect is present, it is impossible to recover even when the other diagnoses and adjustments are performed. Therefore, for example, a message such as "Devices need to be changed" is displayed on the user interface 12, and the process ends. In contrast, in step S141, if it is determined that no image defects are present, the process proceeds to the next step S142.

In step S142, the diagnostic chart for transfer is selected from the multiple types of charts which are obtained through the reading operation in step S12. The diagnostic chart for transfer is selected on the basis of the code information 74. In the next step S143, the image of the selected diagnostic chart for transfer is compared with the original image, and it is determined whether or not the transfer voltage is to be changed. If it is determined that the transfer voltage is to be changed, the charts having inaccurate density are processed even when the process continues. Therefore, a message such as "Output the charts and read the charts again" is displayed on the user interface 12, and the process ends. In the image forming apparatus 10, the transfer voltage is adjusted, and the multiple types of charts other than the diagnostic chart for a spot and/or a streak are output and read again. In contrast, in step S143, if it is determined that the transfer voltage is not to be changed, the process proceeds to the next step S144.

In step S144, the exposure adjustment chart is selected from the multiple types of charts which are obtained through the reading operation in step S12. The exposure adjustment chart is selected on the basis of the code information 68. In step S144, the exposure amount is adjusted as illustrated in FIGS. 6A and 6B. The exposure adjustment is performed prior to the density non-uniformity adjustment and the gradation adjustment because non-execution of exposure adjustment affects, by a large extent, density in a density non-uniformity adjustment chart and a gradation adjustment chart which are output.

However, when the correction amount is larger than a predetermined value as illustrated in the next step S145, it is impossible to perform correction, and the process ends.

In the next step S146, the density non-uniformity adjustment chart is selected from the multiple types of charts which are obtained through the reading operation in step S12. The density non-uniformity adjustment chart is selected on the basis of the code information 82. In step S146, as illustrated in FIGS. 7A and 7B, density non-uniformity is adjusted. Density non-uniformity is adjusted prior to the gradation adjustment because non-execution of density non-uniformity adjustment affects, by a large extent, density in a gradation adjustment chart which is output.

However, when the correction amount is larger than a predetermined value as illustrated in the next step S147, it is impossible to perform correction, and the process ends.

In the next step S148, the gradation adjustment chart is selected from the multiple types of charts which are obtained through the reading operation in step S12. The gradation adjustment chart is selected on the basis of the code information 86. In step S148, gradation is adjusted as illustrated in FIGS. 8A and 8B. Gradation is adjusted at the last step. The reason is as follows. The patches are separately arranged in the main scanning direction in the exemplary embodiment. Therefore, density non-uniformity exerts a strong adverse effect, and reflection of the density non-uniformity information improves accuracy.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   at least one hardware processor configured to implement:
   controlling output of a plurality of types of charts and reading of images of the plurality of types of charts; and
   performing a plurality of types of processes in a predetermined order in accordance with the images of the charts and original images used to output the charts, each of the plurality of processes being at least one of diagnosis and adjustment,
   wherein the charts include a diagnostic chart for a spot and/or a streak and a diagnostic chart for transfer, and, after the at least one hardware processor performs a first diagnosis based on the diagnostic chart for a spot and/or a streak, the at least one hardware processor performs a second diagnosis based on the diagnostic chart for transfer,
   wherein the charts further include a density non-uniformity adjustment chart and a gradation adjustment chart, and the at least one hardware processor is further configured to implement:
   performing, in a following sequence, the first diagnosis based on the diagnostic chart for a spot and/or a streak, the second diagnosis based on the diagnostic chart for transfer, a density non-uniformity adjustment based on the density non-uniformity adjustment chart, and a gradation adjustment based on the gradation adjustment chart.

2. The image forming apparatus according to claim 1,
   wherein the charts further include an exposure adjustment chart, a density non-uniformity adjustment chart, and a gradation adjustment chart, and the at least one hardware processor is further configured to implement:
   performing, in a following sequence, the first diagnosis based on the diagnostic chart for a spot and/or a streak, the second diagnosis based on the diagnostic chart for transfer, an exposure adjustment based on the exposure adjustment chart, a density non-uniformity adjustment based on the density non-uniformity adjustment chart, and a gradation adjustment based on the gradation adjustment chart.

3. An image forming apparatus comprising:
   at least one hardware processor configured to implement:
   controlling output of a plurality of types of charts and reading of images of the plurality of types of charts; and
   performing a plurality of types of processes in a predetermined order in accordance with the images of the charts and original images used to output the charts, each of the plurality of processes being at least one of diagnosis and adjustment,
   wherein the charts include a diagnostic chart for a spot and/or a streak, a diagnostic chart for transfer, an exposure adjustment chart, a density non-uniformity adjustment chart, and a gradation adjustment chart, and the at least one hardware processor is further configured to implement:
   performing, in a following sequence, a first diagnosis based on the diagnostic chart for a spot and/or a streak, a second diagnosis based on the diagnostic chart for transfer, an exposure adjustment based on the exposure adjustment chart, a density non-uniformity adjustment based on the density non-uniformity adjustment chart, and a gradation adjustment based on the gradation adjustment chart.

4. A non-transitory computer readable medium storing a program causing a computer to serve as the image forming apparatus according to claim 1.

* * * * *